United States Patent Office.

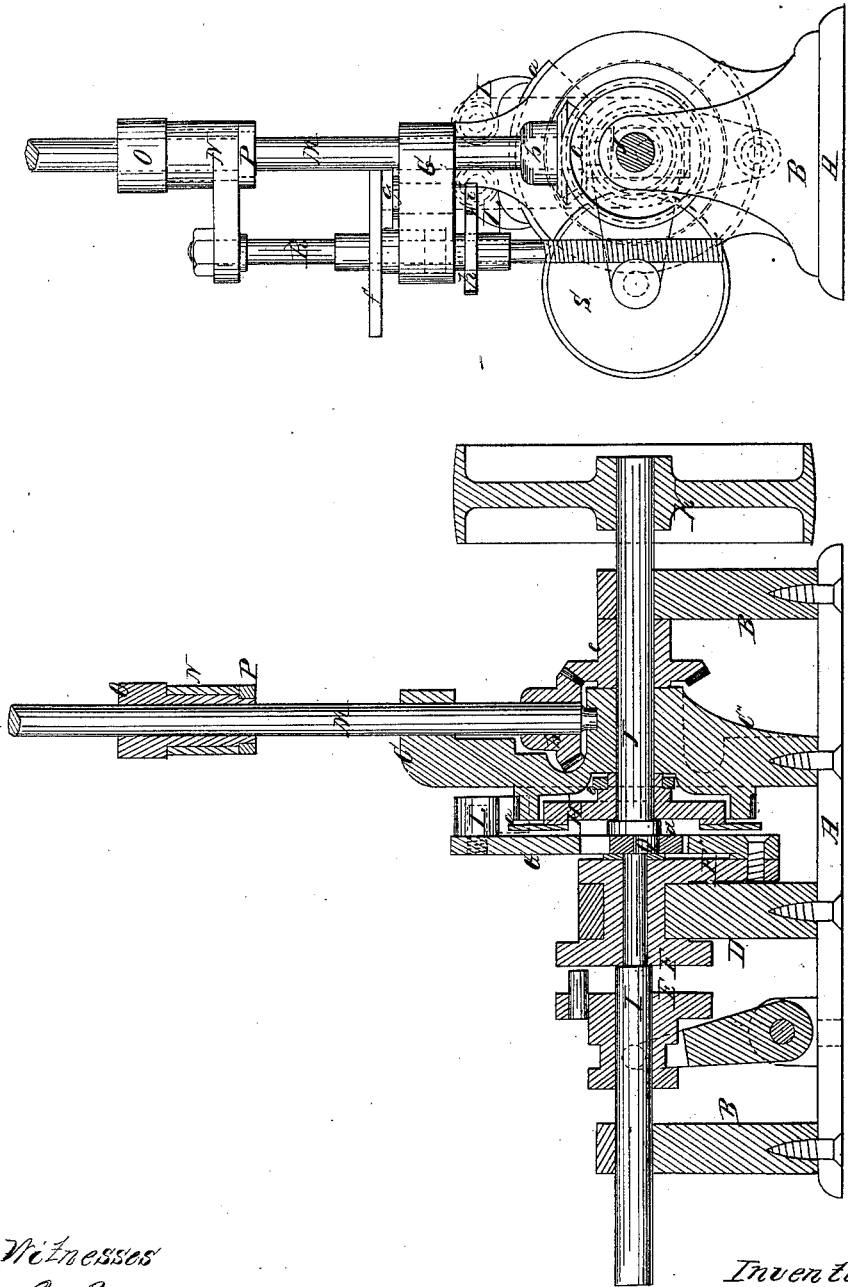

J. E. GILLESPIE, OF HARTFORD, CONNECTICUT, ASSIGNOR TO HIMSELF AND GEORGE S. LINCOLN AND COMPANY, OF SAME PLACE.

*Letters Patent No. 80,403, dated July 28, 1868.*

IMPROVEMENT IN GOVERNORS.

The Schedule referred to in these Letters Patent and making part of the same.

Be it known that I, J. E. GILLESPIE, of Hartford, in the county of Hartford, and State of Connecticut, have invented a new and useful Machine for Governing the Speed of Motors; and I do hereby declare that the following is a full, clear, and exact description of the construction and operation of the same, reference being had to the annexed drawings, making a part of this specification, in which—

Figure 1 is a longitudinal elevation, and

Figure 2 is a transverse section.

The object of my invention is to move the gates or valves of a water-wheel or other engine in a more direct manner, and to more correctly communicate the action of the governing-device to them, and at the same time to relieve the governing-device of the labor and friction.

To enable those skilled in mechanics to construct and use my invention, I will proceed to describe it in detail.

Similar letters refer to the same parts in both figures.

A is the bed-plate, upon which the machine is erected.

B B are stands, for supporting the shafts I and J. The pulley-shaft, J, passes through the stand B, and also through the stand C, which has a spur-gear, C″, securely fastened to it. The centre of the gear is concaved to a greater depth than the thickness of its face. The stand is cut away behind the gear C″, to make a slot between the stand and gear, through which the spur-gear S works.

In the recess formed within the circle of the gear C″ is a disk, H, with a pinion, e, secured to the hub of disk H, with the shield or guard a upon its face.

The disk works loosely on the shaft J, and does not turn with it, but is only held in place by it.

Upon the end of the shaft J is a crank, 2, that enters a hole in the sliding block d, fitted into a slot in the lever G, to which a reciprocating motion is given by the crank 2, as it is revolved by any suitable means.

The lever G is pivoted at one end to the arm F″ projecting from the end of the clutch F, which has its journal in the stand D. Upon the other end of the lever G is a pair of pawls, L L, which rest upon the shield a of disk H. The shield a is of sufficient length to allow the reciprocating motion given to the lever G by crank 2 to be all of it performed, and still the pawls rest upon the shield a.

The spur-gear S has a bearing in the arm that projects from the stand C.

On the end of the bearing or journal of the gear S is a pinion, that is actuated by the rack R.

The shaft I is designed to be connected to the gate of a water-motor or valve of any other motor. It may be used in connection with and has its bearings in stand B and clutch F. It extends through the clutch F to the block d in the lever G, but has no connection with it.

Motion is given to the shaft I by means of the sliding part of the clutch E, which is feathered to the shaft I, and moved in the direction of its length by a forked lever or other suitable device.

The operation is as follows: Motion is given to the shaft J by means of the pulley K, being belted to any convenient or suitable shaft, as is usual for driving or governing-device. The bevel-gear c engages bevel-pinion b, and gives a rotary motion to the upright, M, which is supposed to represent the staff of an ordinary governor, not shown in the drawing, but too well known to need particular description; therefore I will only say, in passing, that N is an arm or projection from the governor, through which the sleeve O P passes and revolves. Upon any change of the speed of the shafting taking place, the arm N is either elevated or depressed, as the speed is either increased or decreased. In either case the rod R is actuated, and a rotary motion given to the spur-gear S, which in turn meshes with the pinion e on the hub of the shield-disk H, causing it to revolve partially, carrying the shield a from under the pawls L L, or more properly from under one of them, causing it to engage the teeth of the fixed gear C″.

The spur-gear S and pinion e are so proportioned to one another that one or more revolutions of the shield-disk H is the result of a change in the governing-device from one extreme of its range to the other. The pawls of the lever G, resting on the shield $a$, are held clear of the teeth of the fixed gear C″. When no change is taking place or has taken place in the governing-device, or speed of the shafting to which the governing-device is attached, the reciprocating motion of the lever G, caused by the rotary motion of crank 2, is not interrupted.

But when the change indicated above takes place or has taken place, and the shield $a$ is moved to one side, and the pawl has engaged the teeth of the fixed gear C″, then the pawl becomes the fulcrum of the lever G, causing the opposite end of the lever G to be moved sufficient to allow the crank 2 to complete its revolution, the pawl on the opposite side of the lever G being held clear of the teeth of the fixed gear C″ by the shield $a$. If the shield $a$ moves no further, the reciprocating motion of the lever G is continued, but in a new place, or rather the pivoted end of the lever G has taken another position in the circle, and continues to take a new position in the circle at any change of the shield $a$.

It will be perceived that, at every change of the speed of the shafting, the arm F″, to which the lever G is pivoted, assumes a new position, carrying the shaft I with it, by means of the clutch E F, and opening or closing the gate or valve of the motor or other engine to which the shaft I may be attached.

It will be seen, by the foregoing description, that the shaft I always takes a position in exact imitation of the motion of the shield $a$, which is moved by the governing-device.

The shield does not differ essentially from the well-known device known as the Schofield device, except that it is caused to make one or more complete revolutions on its axis, instead of being confined to a very small part of a revolution, as in the device referred to.

Neither do the pawls L L differ much from the pawls of the device referred to above, as they reciprocate over and on the shield $a$, but the fixed gear C″ and revolving fulcrum F″ constitute a new and peculiar action upon the gate or valve of a water-motor, or other engine to which they may be connected, not heretofore obtained.

It will be seen that the rack R is a screw, working in a worm-pinion, so called. By rotating rack R by any suitable means, the relative position of the governing-device to the spur-gear S and shield $a$ is or may be changed at will. Therefore,

What I claim as my invention, and desire to secure by Letters Patent, is—

1. The clutch F, with its arm F″, in combination with the lever G and stand D, substantially as specified, for the purpose set forth.

2. The shaft I and sliding portion of clutch E, in combination with the arm of the clutch F and the lever G, substantially as set forth.

3. Shaft J, with its crank 2, in combination with the fixed gear or toothed circle C″, disk H, lever G, and revolving fulcrum F″, substantially as specified, for the purpose set forth.

4. The screw-rack R and its worm-pinion, in combination with the gear S and shield-disk H $a$, substantially as specified, for the purpose set forth.

J. E. GILLESPIE.

Witnesses:
   Thomas McManus,
   Nellie McManus.